(12) United States Patent
Acker, Jr. et al.

(10) Patent No.: US 9,607,486 B2
(45) Date of Patent: Mar. 28, 2017

(54) SHOPPING PROCESS INCLUDING MONITORED SHOPPING CART BASKET WEIGHT

(71) Applicant: Wal-Mart Stores, Inc., Bentonville, AR (US)

(72) Inventors: Joel Bennett Acker, Jr., Brush Prairie, WA (US); Douglas James Pedley, Portland, OR (US); Richard Neil Cancro, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 726 days.

(21) Appl. No.: 13/753,448

(22) Filed: Jan. 29, 2013

(65) Prior Publication Data

US 2014/0214577 A1    Jul. 31, 2014

(51) Int. Cl.
| | |
|---|---|
| G07G 1/00 | (2006.01) |
| G01G 19/414 | (2006.01) |
| B62B 3/14 | (2006.01) |
| G06Q 20/20 | (2012.01) |
| G06Q 20/18 | (2012.01) |
| B62B 5/00 | (2006.01) |

(52) U.S. Cl.
CPC .......... *G07G 1/0081* (2013.01); *G06Q 20/20* (2013.01); *B62B 3/1424* (2013.01); *B62B 5/0096* (2013.01); *G01G 19/4144* (2013.01); *G06Q 20/18* (2013.01); *G07G 1/0054* (2013.01)

(58) Field of Classification Search
None
See application file for complete search history.

(56) References Cited

U.S. PATENT DOCUMENTS

| | | | |
|---|---|---|---|
| 4,679,154 A * | 7/1987 | Blanford | ............ G06K 7/10871 186/61 |
| 6,641,037 B2 | 11/2003 | Williams | |
| 6,774,765 B1 * | 8/2004 | Goodwin, III | ........ G01S 5/0231 340/539.18 |
| 6,837,436 B2 | 1/2005 | Swartz | |
| 7,296,737 B2 * | 11/2007 | Silverbrook | ............ G06F 3/014 235/383 |
| 7,580,699 B1 | 8/2009 | Shaw | |
| 7,734,513 B2 | 6/2010 | Bonner | |
| 7,845,554 B2 | 12/2010 | Jacobs | |

(Continued)

*Primary Examiner* — Allen Chein
(74) *Attorney, Agent, or Firm* — Howard & Howard Attorneys PLLC

(57) ABSTRACT

A computer-implemented process aiding a customer scan and rapid checkout process can include monitoring a shopping cart basket weight. The process includes monitoring, in a computerized processor installed to a shopping cart of a customer, a signal from a weight device configured to monitor the shopping cart basket weight. The process further includes automatically generating a basket weight output value based upon the shopping cart basket weight. The basket weight output value includes one of a check against an expected weight of an item from a database, a billing statement total for a bulk good, a check against an expected total order weight to confirm presence of an un-scanned item in the shopping cart basket, and a check against unsafe use of the shopping cart. The process further includes providing a message based upon the basket weight output value.

8 Claims, 9 Drawing Sheets

(56) References Cited

U.S. PATENT DOCUMENTS

| | | | |
|---|---|---|---|
| 2004/0199427 A1* | 10/2004 | van der Loo | A47F 9/047 |
| | | | 705/16 |
| 2005/0256782 A1 | 11/2005 | Sands | |
| 2006/0293968 A1* | 12/2006 | Brice | B62B 3/1424 |
| | | | 705/14.63 |
| 2007/0139212 A1* | 6/2007 | Kaundinya | G06Q 10/06 |
| | | | 340/692 |
| 2012/0284132 A1* | 11/2012 | Kim | G07G 1/0081 |
| | | | 705/20 |
| 2012/0321146 A1* | 12/2012 | Kundu | G06Q 20/202 |
| | | | 382/118 |
| 2013/0346204 A1* | 12/2013 | Wissner-Gross | G06Q 30/0281 |
| | | | 705/14.58 |

\* cited by examiner

SHOPPING PROCESS INCLUDING MONITORED SHOPPING CART BASKET WEIGHT

RELATED APPLICATIONS

This application is related to U.S. application Ser. No. 13/753,457, filed Jan. 29, 2013, which is hereby incorporated herein in its entirety.

FIELD OF THE DISCLOSURE

The present disclosure relates generally to resolving failed barcode scans performed by a customer's portable computerized device. In particular, the present disclosure includes alerting a store associate that a scan generated by a customer operated purchasing device has failed and facilitating resolution of the scan fault.

BACKGROUND

Shoppers select products from the aisles of a store, place them into a shopping cart, and proceed to a checkout line. In one embodiment, at the checkout line, the shoppers remove the products from the cart and place them onto a conveyor belt that is fed to a cashier. The cashier rings up the price of each product and place the purchased products into a bag. In another embodiment, stores equip self-scan checkout lines where customers scan and bag their own purchases, supervised by a scale and one cashier per group of self-checkout lines. The scale checks a weight for each product scanned, for example, as an incremental increase to a weight in a bagging station. The function of this weight checked process is two-fold; loss prevention and to assist customers, often when products failed to scan properly. Either cashier operated checkout lanes or self-scan checkout lanes can be time consuming and a source of customer dissatisfaction.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
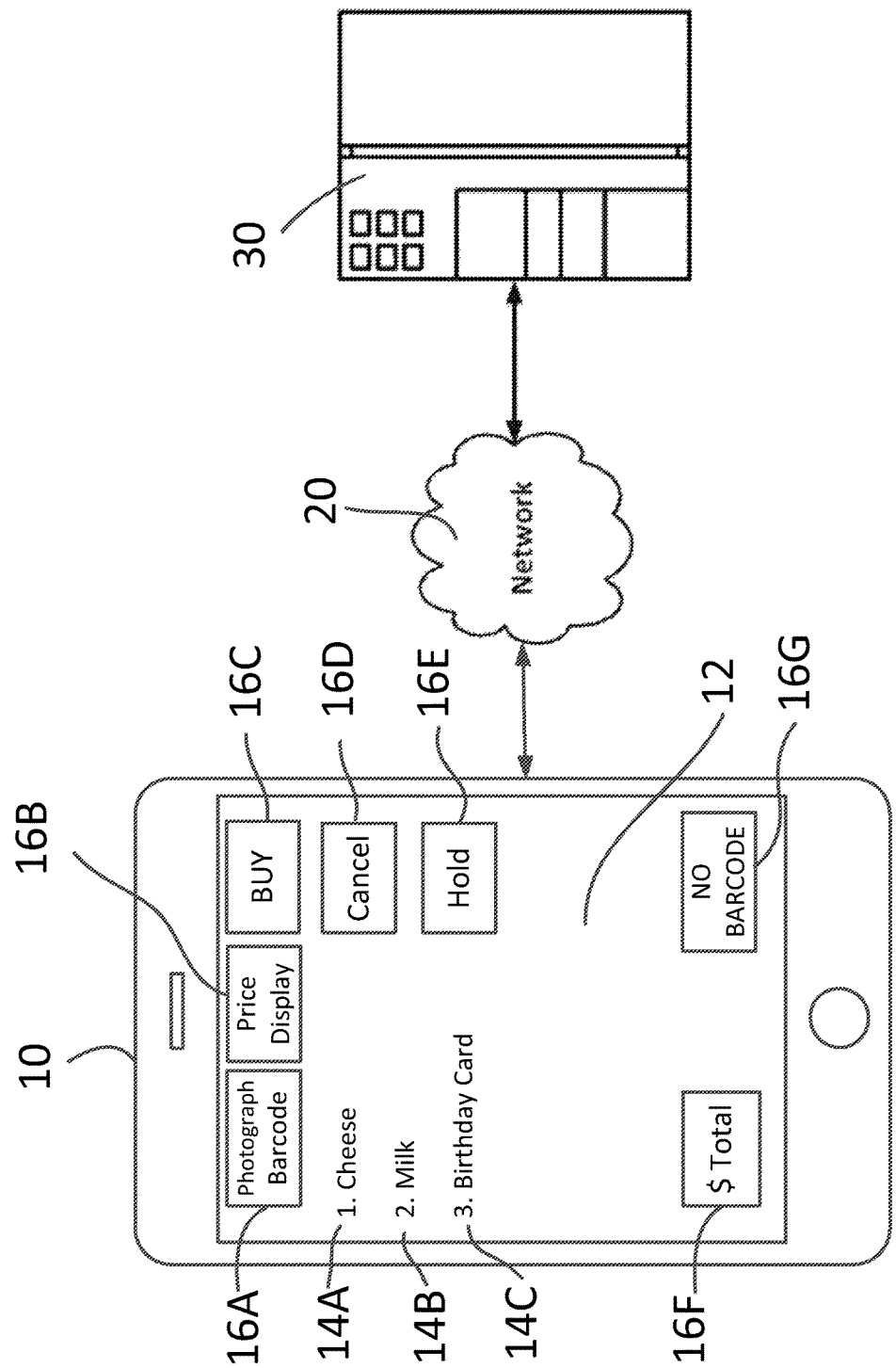
FIG. 1 is a schematic illustrating an exemplary portable computerized device in communication with a product list server via a network, according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

An individual browses the aisles of a store, stopping when a store product becomes an product of interest to that person and catches his or her attention. When he or she wishes to purchase an product while browsing the aisles of a retail store, a portable computerized device such as a smart phone can be used to assist in the shopping. He or she can begin by initiating a shopping application or a program installed upon the computerized device. He or she then follow instructions displayed upon the screen of the device to catalog a series of products to be purchased within the store. In one embodiment, the portable computerized device can be equipped with a camera device, and the camera device can be controlled to either scan for product information or to actively take pictures of products and identify products within the picture.

In one embodiment, an exemplary smart phone with a camera device can be programmed to constantly analyze images from the camera device and recognize any standard barcode or 2D or 3D barcode that appears in the view of the camera. Information from the barcode or an image of the barcode can be sent to a remote server including a computer database for identification and pricing. The user of the phone can then be prompted whether the user intends to purchase the object associated with the scanned barcode. Upon confirmation that the user intends to purchase the item, the phone can prompt the user to place the object in a shopping cart. In another embodiment, the phone can prompt the user to place the object in a particular, indexed bag. The user will repeat this process for each product until they are through shopping. Such shopping can be impromptu, with the user selecting objects in real-time as the user walks through the store. The shopping can be aided by a shopping list loaded and saved in the device.

In a smart phone or other device monitoring images from a camera device, scanning the images for barcodes that can be identified, false positive identifications of a product can result from a person, for example, carrying the phone at her side while walking down a shopping aisle. In order to prevent such false positive identifications, a barcode can be required to be identified within a series of images through a threshold duration of time, held steady in the image according to a threshold stability, and/or a barcode can be required to fill some threshold portion of the image indicating that the camera device is being held proximately to the barcode for the purpose of the user indicating an intent to buy the object associated with the barcode.

According to one embodiment, a shopping cart can be equipped with a measuring device to measure a weight of objects within the basket. Such an exemplary shopping cart can include a computerized control module in communication with an exemplary wheatstone bridge circuit installed to a support arm of the basket of the cart, the circuit measuring strain in the support arm as a measure of weight applied to the basket. Such a measurement can be filtered over time, for example, to remove an effect of the user incidentally touching the basket or transitory effects upon the measurement caused by the shopping cart moving throughout the store. Such a scale can be used to confirm that each item put into the basket is successfully scanned by cross-referencing each incrementally scanned item to each incremental increase in weight. Items that do not have set weights, such as bulk fruits and vegetables, could be set in a particular area of the cart separate from the weighed basket, for example, in an area near the handle of the cart wherein a small child can sit. In another example, some other accommodation can be made, for example, with weighing stations in a produce section providing a weight and sticker with a barcode to scan for a bulk item or providing an indexed bag for items with variable weight that can be later verified or summarily approved by a store employee.

According to another embodiment, user with a shopping cart of scanned objects, upon indicating that shopping is complete, can be provided with instructions to proceed to a checkout line where the products are verified by weight and or RFID, compared to their shopping list, and they make the proper payment. While this payment can be a traditional payment with cash or credit card, others can use Bling®, Google Wallet®, or some other smart phone application a similar process to complete the payment step.

Procedures to scan objects for purchase in a store with a customer operated purchasing device are imperfect. A scanning fault or a scanning error can be described whenever the customer tries to scan an object, indicating a desire to purchase the object in question, and the object is not placed in a condition for checkout and purchase. Objects can be incorrectly entered in the store database. Objects can be placed on a shelf and erroneously not entered into the store database. A barcode can provide a positive identification to an incorrect product. Such a successful scan indicated to an incorrect product could be identified, for example, if the product is weighed either at the cart or at the checkout, and the measured weight does not correspond to a reference weight for the product. In another example, in an image used to scan a barcode, logos or other identifying marks on the product can also be identified. In the event that the barcode scan identifies a code corresponding to a breakfast cereal, and a logo in the picture identifies coffee filters, a scanning error can be indicated. In another example, an item can be restricted by age, for example, including alcohol or a movie with restricted content, wherein a scanned item correctly identified is not ready for purchase without confirmation of the age of the person buying the item. In another example, a product can be stored remotely, for example, high value jewelry or restricted anti-histamines, with merely a barcode presented to the customers to indicate an intent of the customer to buy the object, and intervention of a store employee is required to retrieve the desired object and complete the sale. In one embodiment, if a barcode photo or scan from the shopper's portable computerized device fails, if the photo or scan is successful but the store database fails to recognize the product, or purchase of the object scanned requires intervention of a store employee to complete the purchase, a message will be sent to a store associate, informing him or her that a scanning error has occurred and give the location of the shopper.

In one embodiment, if a barcode photo or scan from a shopper's portable computerized device fails, or the photo or scan is successful, but the store database fails to recognize the product, the shopper will be alerted to this failure and asked to place the product in the shopping cart separate from other bagged products.

In one embodiment, if a barcode photo or scan from a shopper's portable computerized device fails, or the photo or scan is successful, but the store database fails to recognize the product, the shopper will be alerted to this failure and asked to take a photograph of the product with his or her portable computerized device and of any other barcodes, logos, or other identifying information, if any, of the product, which can be transmitted to an in-store associate for identification purposes. If the product is identified, the shopper will be notified via his or her portable computerized device and told to place it into his or her shopping bag. If still unresolved, the shopper will be notified via his or her portable computerized device that a store associate will arrive shortly to further assist the shopper. In an event that an identification of an object is taking too long, for example with a time since the scan fault exceeding a threshold scan fault time, and inconveniencing the customer, management of the store can be alerted, and an option for management to intervene and set a price can be provided.

Communication to store employees can include a number of embodiments. In one embodiment, a push-notification taking the form of an exemplary text message can be provided to an appropriate store employee trained to resolve the scan fault. In another embodiment, communication to the employee can take the form of an audio or vibration alert. In another embodiment, communication to the employee can take the form of activation of an application on the portable computerized device of the employee.

Once the store employee is notified of a scan fault, a message can be provided to the customer, reassuring the customer that a store employee is either working to resolve the fault or on the way to meet with the customer.

A customer can scan a number of items. Identification of these items can be stored in a list described as a virtual shopping cart. In one embodiment, the customer can be displayed a running order price total as items are scanned to the virtual shopping cart.

Referring now to FIG. 1, a portable computerized device 10 is illustrated in communication with a product location index server 30 via a network 20. In some embodiments, as shown in the illustrative example, the portable computerized device 10 is displaying a graphical user interface (GUI) 12 configured as a touch screen device that is displaying an electronic sales receipt list comprised of a plurality of products, e.g., product 14A, product 14B, and product 14C.

The GUI 12 further includes a plurality of input objects, which allow the user to provide commands to portable computerized device 10. The input objects include a "Photograph Barcode" input-output icon 16A. In one embodiment, device 10 provides the information necessary to provide the identification of the product, to the server 30, and server 30 returns the product pricing to the portable computerized device 10, displayed to the user via GUI 12 and input-output icon 16B. The shopper then inputs, via input-output icon 16C "Buy" or input-output icon 16D "Cancel", the command to either purchase the product or to not. In some embodiments, if the product is not located in the server 30, server 30 returns an "product not found" code to the portable computerized device 10 and the input-output icon 16B instead displays a message identical or similar to "Associate Notified". Simultaneously, a signal is sent to a store associate center so a store associate can resolve this issue. The selected product is then moved to input-output icon 16E, "Hold", until an associate resolves the issue, and the customer can continue shopping. In one In one embodiment, the customer may be asked to take additional pictures of the product to further assist an associate to quickly resolve this identification issue.

If the customer cannot find a barcode on the product to capture, or one on the shelf for the group of products, he or she then has the option of selecting input-output icon 16G "No Barcode", and to continue shopping. This will signal a store associate to assist the shopper and to resolve the issue. In one embodiment, the shopper is asked via his or her portable computerized device 10 to capture additional pictures of the product so an associate can quickly resolve the issue. In one embodiment, a remote server can be utilized to provide the store associate with information about the store inventory, prices, and products available that are similar to the product at issue.

As the customer continues shopping and adding items into to his or her shopping bag for purchase, the total of the products in the shopping bag or bags can be displayed via input-output icon 16F. An option to conclude shopping and head to the checkout for payment can be presented as another icon or can be part of display associated with icon 16F Referring now to FIG. 2, a schematic illustrating exemplary components of portable computerized device of FIG. 1 is illustrated. In the illustrative embodiment, the portable computerized device includes a processing device 100, a user interface 102, communication device 104, a memory device 106, a locating device 107, a camera device 108, and a Radio Frequency Identification Device (RFID) 109. It is noted that the portable computerized device 10 can include other components and some of the components are not always required. Portable computerized device 10 can be operated as a customer operated purchasing device for use in a process to permit a customer to scan items to an electronic sales receipt list and proceed to a rapid checkout, as disclosed herein.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the portable computerized device 10. In the illustrative embodiment, the processing device 100 also executes a customer rapid scan and checkout module 110 and a product scan module 112, and a scan fault identification module 113, which are described in greater detail below.

User interface 102 is a device that allows a user to interact with the portable computerized device 10. While one user interface 102 is shown, the term "user interface" can include, but is not limited to, a touch screen, a physical keyboard, a mouse, a microphone, and/or a speaker.

The communication device 104 is a device that allows the portable computerized device 10 to communicate with another device, e.g., the product location index server 30, via the network 20. The communication device 104 can include one or more wireless transceivers for performing wireless communication and/or one or more communication ports for performing wired communication.

The memory device 106 is a device that stores data generated or received by the portable computerized device 10. Memory device 106 can include, but is not limited to, a hard disc drive, an optical disc drive, and/or a flash memory drive.

The locating device 107 determines a location of the portable computerized device 10 according to processes known in the art. According to one embodiment, locating device can include an RTLS device, for example, utilizing cell phone tower signals to triangulate or otherwise determine a location of the device.

The camera 108 is a digital camera that captures a digital photograph. Camera 108 receives an instruction to capture an image, captures an image of an object, i.e., a barcode of a product, and outputs the digital photograph. The digital photograph can be a bitmap, a JPEG, a GIF, or any other suitably formatted file. The camera 108 can receive the instruction to capture the image from the processing device 100 and can output the digital photograph to the processing device 100.

The Radio Frequency Identification Device (RFID) 109 can determine the location of the portable computerized device 10 by triangulating positions by using Radio Frequency Identification Device (RFID) radio signals from small transmitters placed throughout a building in known locations. In another embodiment, RFID device 109 can determine proximity of the device to a mobile feature, such as a store clerk, or proximity to a temporary or one-time display not loaded into a store database.

The customer rapid scan and checkout module 110 includes programming enabling a user to walk through the store, scan items for purchase, put the items into the user's shopping cart or bag, and proceed through a rapid checkout process, wherein an electronic sales receipt list including the products scanned and put into the cart or bag are used to provide for easy payment for the products purchased. Items scanned are tallied, and according to processes disclosed herein, the store provides the customer with an ability to pay for the goods and exit the store.

Product scan module 112 monitors data from a camera device and identifies a information related to a scanned product, so that the product can be purchased. Product scan module 112 can include image recognition software to identify object information such as a barcode or logo information, or product scan module 112 processes such images so that they can be processed in a remote server to identify the object information.

Scan fault identification module 113 monitors operation of the product scan module 112. In the event that a scan fails to identify a product that can be purchased or a product misidentification according to embodiments disclosed herein occurs, module 113 includes programming to prompt action from the customer, prompt action from a nearby sales associate, or initiate other actions to resolve the scan fault.

Embodiments in accordance with the present disclosure may be embodied as an device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied an any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

Figure 3:
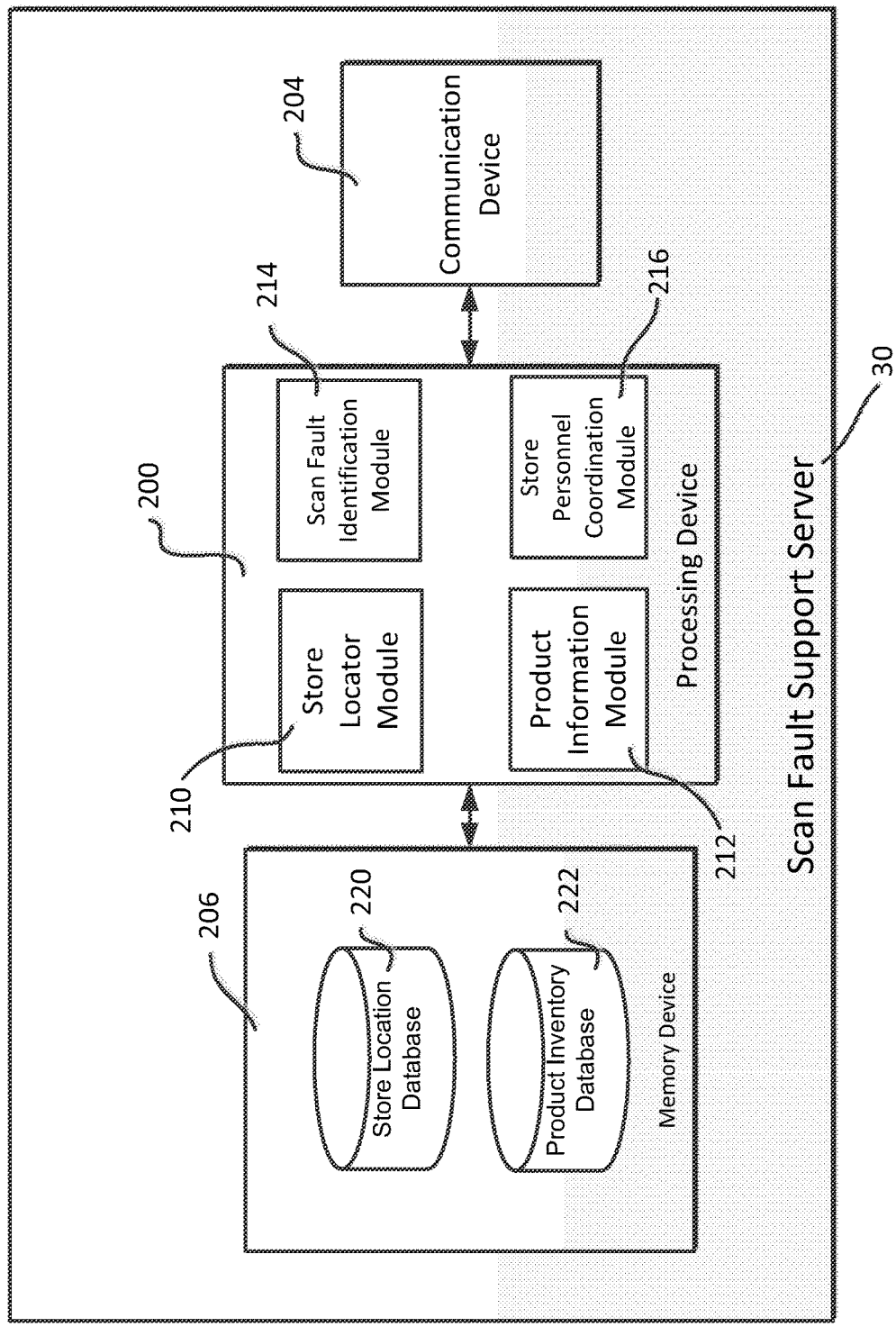
FIG. 3 is a schematic illustrating an exemplary scan fault support server, according to some embodiments of the present disclosure.

FIG. 3 is a schematic illustrating an exemplary scan fault support server. In the illustrated embodiment, the scan fault support server 30 may include a processing device 200, a communication device 204, and memory device 206.

The processing device 200 can include memory, e.g., read only memory (ROM) and random access memory (RAM), storing processor-executable instructions and one or more processors that execute the processor-executable instructions. In embodiments where the processing device 200 includes two or more processors, the processors can operate in a parallel or distributed manner. In the illustrative embodiment, the processing device 200 executes one or more of a store locator module 210, a product information module 212, a scan fault identification module 214, and a store personnel coordination module 216.

The communication device 204 is a device that allows the product location index server 30 to communicate with another device, e.g., the portable computerized device, via the network 20. The communication device 204 can include one or more wireless transceivers for performing wireless communication and/or one or more communication ports for performing wired communication.

The memory device 206 is a device that stores data generated or received by the product location index server 30. The memory device 206 can include, but is not limited to a hard disc drive, an optical disc drive, and/or a flash memory drive. Further, the memory device 206 may be distributed and located at multiple locations. The memory device 206 is accessible to the processing device 200. In some embodiments, the memory device 206 stores a store location database 220 and a product information database 222.

In some embodiments, the store location database 220 can store the store locations of one or more stores operated or associated with a retailer. The store location database 220 may be queried using a specific location, e.g., GPS coordinates, or a general location, e.g., postal zip code or city/state, and can return one or more stores that are proximate to the specific or general location. The store location database 220 may further be configured to store maps corresponding to each store location. The store location database 220 may be queried with a store location and can return the store map corresponding to the store location.

As discussed, the processing device 200 may execute the store locator module 210. The store locator module 210 receives a location from the portable computerized device and determines one or more store locations corresponding to the received location. In some embodiments, the store locator module 210 queries the store location database 220 with the received location and receives one or more store locations that correspond to the received location. For example, the store location database 220 may return any store locations that are within a predetermined distance, e.g., 10 miles, from the received location. When more than one store location is received, the store locator module 210 may automatically select the store location nearest to the received location or may provide the store locations to the portable computerized device, thereby allowing the portable computerized device or the user to select the store location.

The product information database 222 stores information about products in inventory of one or more stores. Database 222 interacts with product information module 212 such that queries regarding products including prices, barcode labels, logos present on packaging, and other information regarding different products can be accessed. Product information database 222 can store and provide information specific to particular store locations as returned by store locator module 210.

The product information module 212 receives an object receives information from a customer scan of a barcode or other similar information and can query database 222 to determine whether a product is associated with the customer scan.

Scan fault identification module 214 can perform operations as disclosed in relation to scan fault identification module 113, such that programming to determine that a scan fault has occurred can be determined at either the portable computerized device or at the server. In addition or in the alternative, scan fault identification module 214 can share information with scan fault identification module 113 and include programming to coordinate retrieval of information and communications with store personnel through server 30.

Store personnel coordination module 216 includes programming to receive notifications of scan faults and alert store personnel to the scan fault. Further module 216 can include programming to process a location of the customer with the scan fault, the location of the store personnel, and direct the correct personnel to the customer needing assistance.

Figure 2:
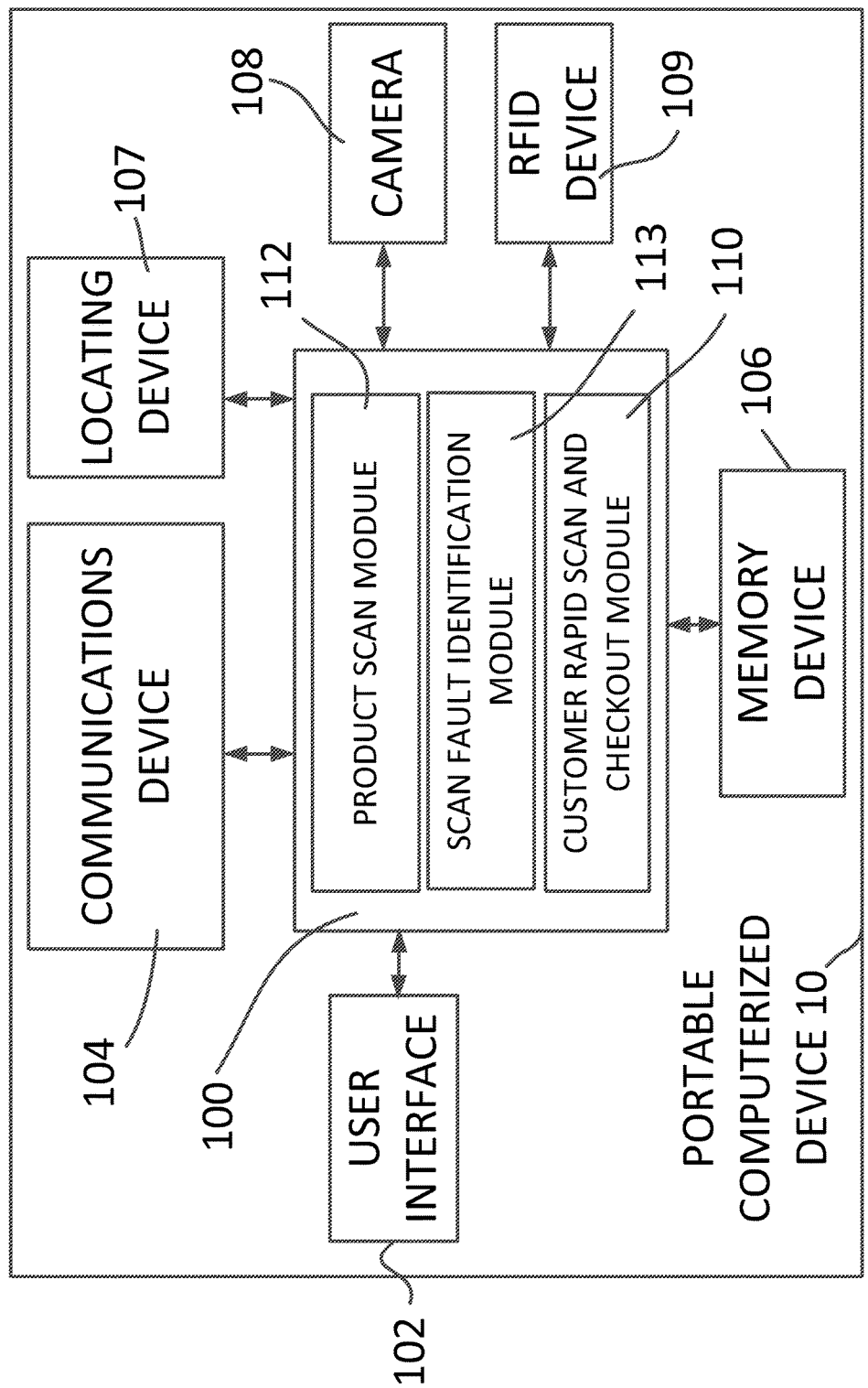
FIG. 2 is a schematic illustrating exemplary components of the portable computerized device of FIG. 1, according to some embodiments of the present disclosure.

Store personnel can be equipped with portable computerized devices similar to the device disclosed in relation to FIG. 2. A device utilized by store personnel can display information about a customer needing assistance, information about the scan fault in question, information about the store inventory, and location information about the customer, products in the store, locations of store management, communication links to the customer and to management, and a current location of other store personnel.

Portable computerized devices as disclosed herein can take a number of different embodiments. Such a device can include a smart phone, a tablet computer, a laptop computer, or glasses equipped to project images in a view of the user. Exemplary portable computerized devices are provided, but the disclosure is not intended to be limited to the provided examples.

Figure 4:
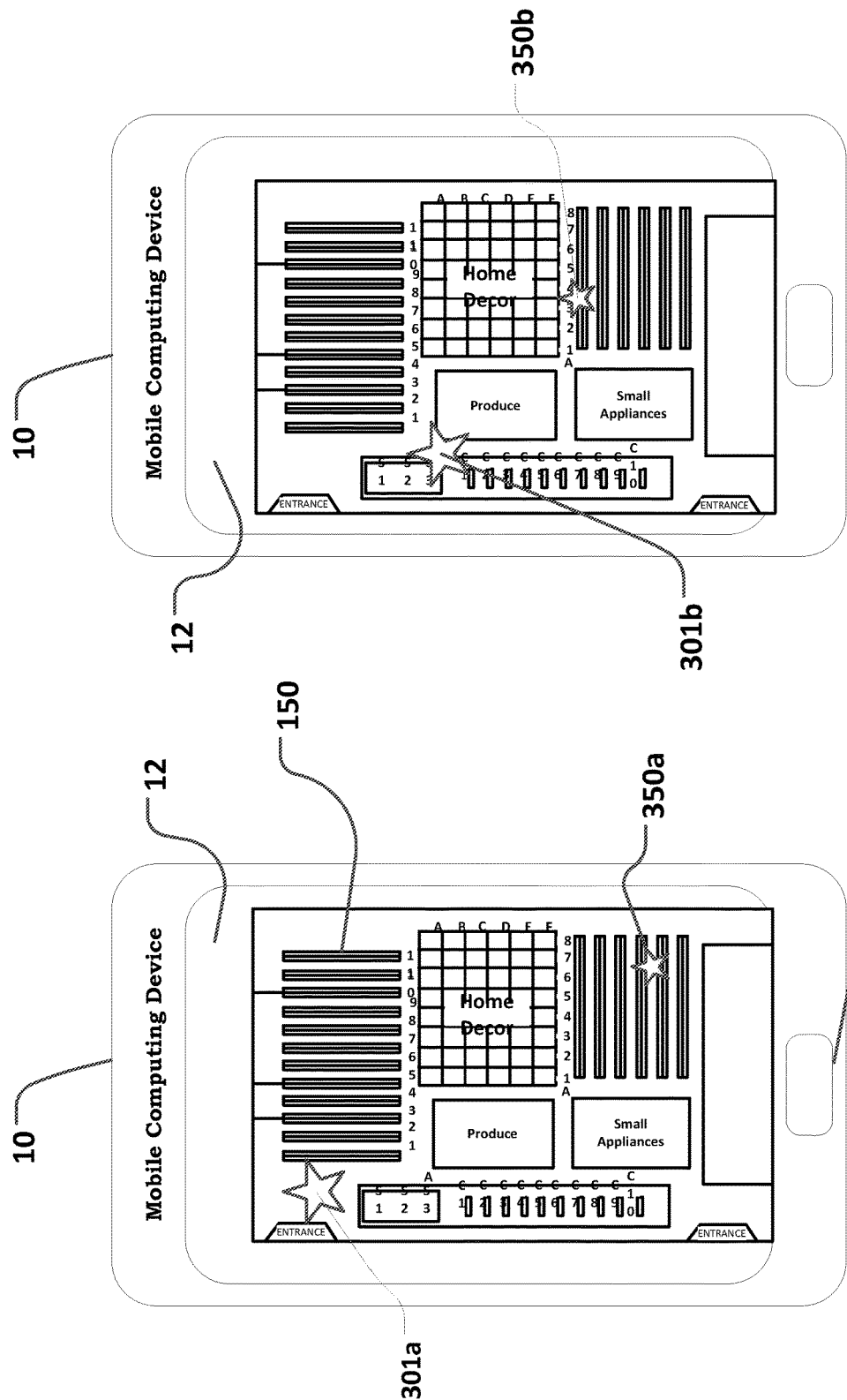
FIGS. 4A and 4B are drawings of maps on an exemplary portable computerized device illustrating the locations of both the shopper and the store associate, according to some embodiments of the present disclosure.

Referring to FIG. 4A, map 150 is displayed on portable computerized device 10. In some embodiments, the portable computerized device 10 can display the location of the customer in real time as the customer travels throughout the store. In this way, the store associate can reference his or her location, represented by You-Are-Here icon 301*a*, in relation store landmarks and customer location icon 350*b* and be better able to locate the customer in the store. It is noted that the example map 150 is provided for example and not intended to be limiting.

Referring to FIG. 4B, You-Are-Here icon 301*b* is displayed on map 150 on portable computerized device 10. It is shown in a new location, indicating that the user has moved to a new location and the You-Are-Here icon 301*b* on portable computerized device 10 is keeping track of the user's progress. Notice that the customer's location, icon 350*b*, has also changed position, reflection a change in the customer's location as he or she continues shopping.

Wherein a plurality of trained or qualified employees are present to assist a customer, a number of criteria are envisioned to select an employee to help the customer. An employee can be designated to help customers based upon management deciding that that employee is particularly skilled at working with customers. An employee can be designated to help customers based upon completion of advanced training, for example, in interacting with a remote server processing scan faults. An employee can be selected based upon a location of the customer, a location of the various employees, and selection of a closest employee to assist the customer. A number of criteria for selecting an employee to assist the customer are envisioned, and the disclosure is not intended to be limited to the particular embodiments provided herein.

Figure 5:
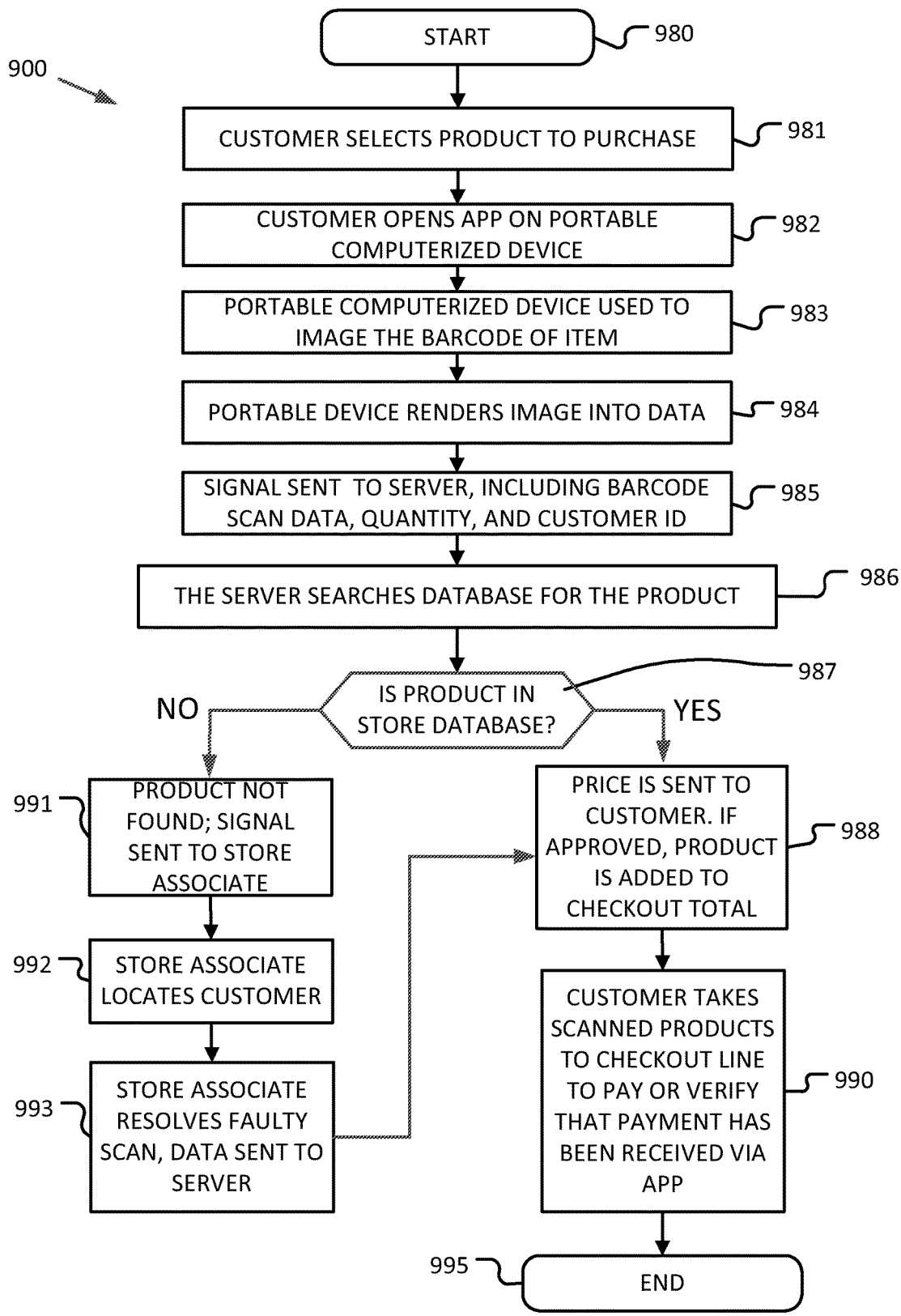
FIG. 5 is a flowchart illustrating an exemplary process for a retail store customer to purchase products from shopping aisles, resolve any product identification failures of a product scanned by a customer, and to complete the purchase of the product, according to some embodiments of the present disclosure.

FIG. 5 is a flowchart illustrating an exemplary process for a retail store customer to purchase products from shopping aisles, resolve any product identification failures of a product scanned by a customer, and to complete the purchase of the product. Process 900 begins at step 980. At step 981, a customer selects a product from a shelf to purchase. At step 982, this customer opens an application on his or her portable computerized device. At step 983, the customer is instructed to use his or her portable computerized device to capture, or scan, the barcode of the product. Step 984 renders the image captured in step 983 into digital data that can be sent to server 30. At step 985, data is sent to server 30 via network 20. Included is the barcode of the product and identification of the customer. At step 986, the server searches its database for the price of the product. At step 987, a yes or no decision is made: is the product in the store database or not. If "yes", then the next step is step 988, where the product price is returned to the customer for final approval. If approved, the product is added to the shopping checkout total, and the customer can view the new total amount on his or her portable computerized device. Next is step 990, the checkout line where the customer takes his or her bags of products to be purchased. In one embodiment, these products are verified by weight. In another embodiment, RFID chips imbedded within the product verify these products. In one embodiment, payment is performed in the conventional manner. In one embodiment, payment is conducted by a credit arrangement on file with the customer and the transaction is complete. In one embodiment, a smartphone, Bling, Google Wallet, or a similar process completes the payment step. After payment, the process ends at step 995

Returning back to step 987, if the answer is "no", then the next step is 991, "Product not Found", and a signal is sent via the network to a store associate for assistance. At step 992, a store associate uses a portable computerized device that communicates via the network to the server to locate the customer. At step 993, the store associate resolves the scan fault; the data is sent to the server via the network. With the scan fault resolved, the process can return to step 988, where the product price is returned to the customer for final approval. If approved, the product is added to the shopping checkout total, and the customer can view the new total amount on his or her portable computerized device. At step 990, the checkout line where the customer takes his or her bags of products to be purchased. In one embodiment, these products are verified by weight. In another embodiment, RFID chips imbedded within the product verify these products. In one embodiment, payment is done in a conventional manner. In one embodiment, payment is conducted by a credit arrangement on file with the customer and the transaction is complete. In one embodiment, a smartphone, Bling, Google Wallet, or a similar process completes the payment step. After payment, the process ends at step 995.

Figure 6:
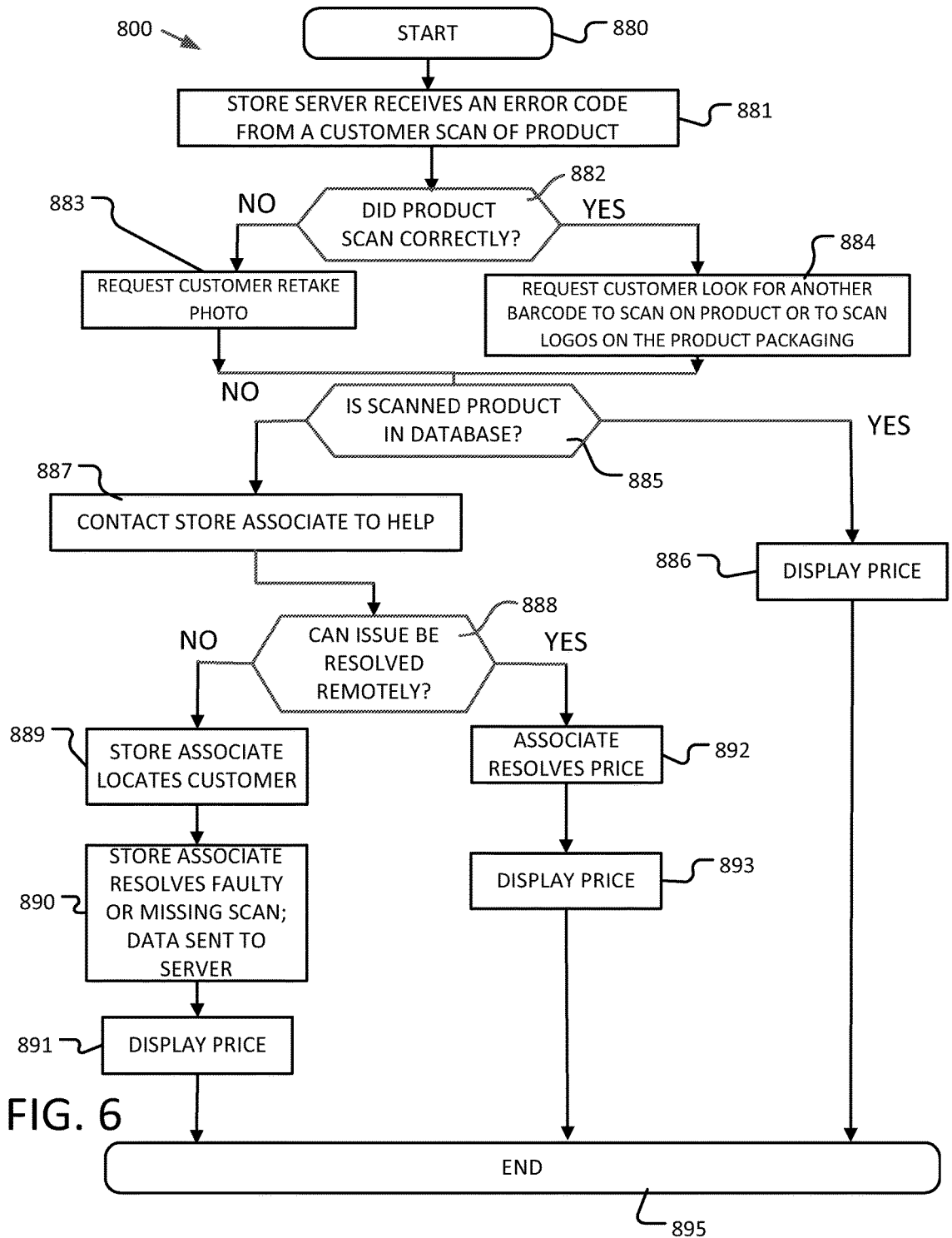
FIG. 6 is a flowchart illustrating an exemplary process to resolve a failed scan of a product to obtain a product's identification from a store database, according to some embodiments of the present disclosure.

FIG. 6 is a flowchart illustrating an exemplary process to resolve a failed scan of a product to obtain the identification of a product from a store database. Process 800 begins at step 880. At step 881, store server 30 receives an error code from a customer's scan (photograph via portable computerized device 10) of a product's barcode. At step 882, the store server decides if the problem lies with a scan fault or that the scan was successful and that the product is not in the database. If it is a scan fault, the process proceeds to step 883, and the customer is instructed to retake the photo of the barcode. If the scan is correct, and the product is not in the store database, then the process proceeds to step 884. Step 884 instructs the customer to look for another barcode on the product to scan as some products have multiple barcodes. At either pathway, the customer may be asked to take a photo of the entire product in addition to the barcode. This will assist a store associate to ID the products remotely if the products are not found in the store database. Next is step 885, a decision if the product barcode was in the store database or not. If yes, the process proceeds to step 886, and the price of the product is displayed to the customer. If the scan is defective during this step, steps are provided to store personnel to resolve the scan fault without continuing to trouble the customer. Upon this occurrence, the next step is 887 and a store associate is contacted to assist the customer. Concurrently, the product is placed on hold and displayed via input-output icon 16E on FIG. 1.

At step 888, can the product identification problem be solved remotely? Yes or no? If yes, the next step is 892, an associate resolves the pricing issue and then step 893, to display the price to the customer.

If no, then the next step is 889; a store associate locates the customer. At step 890, the store associate further assists the customer and resolves the faulty or missing scan so the data can be sent to the server. If this is not possible, a manager override is obtained. The next step is step 891, and the price of the product is displayed to the customer. This concludes process 800.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks.

Processes disclosed herein include a store employee being alerted to a scan fault that failed to return product information from a remote server. In one embodiment, the store employee can initiate an upload of information to the server to facilitate resolution of the issue within the remote server. For example, information from the scan can be identified with a description of the fault and a work order number can be created for remote personnel to correct the information in the database. In an event that the employee definitively finds information that would resolve the database issue, for example, a positive identification of the product and the proper price for the product, the employee can be provided with an option to upload that information to the server for review and incorporation into the database.

Figure 7:
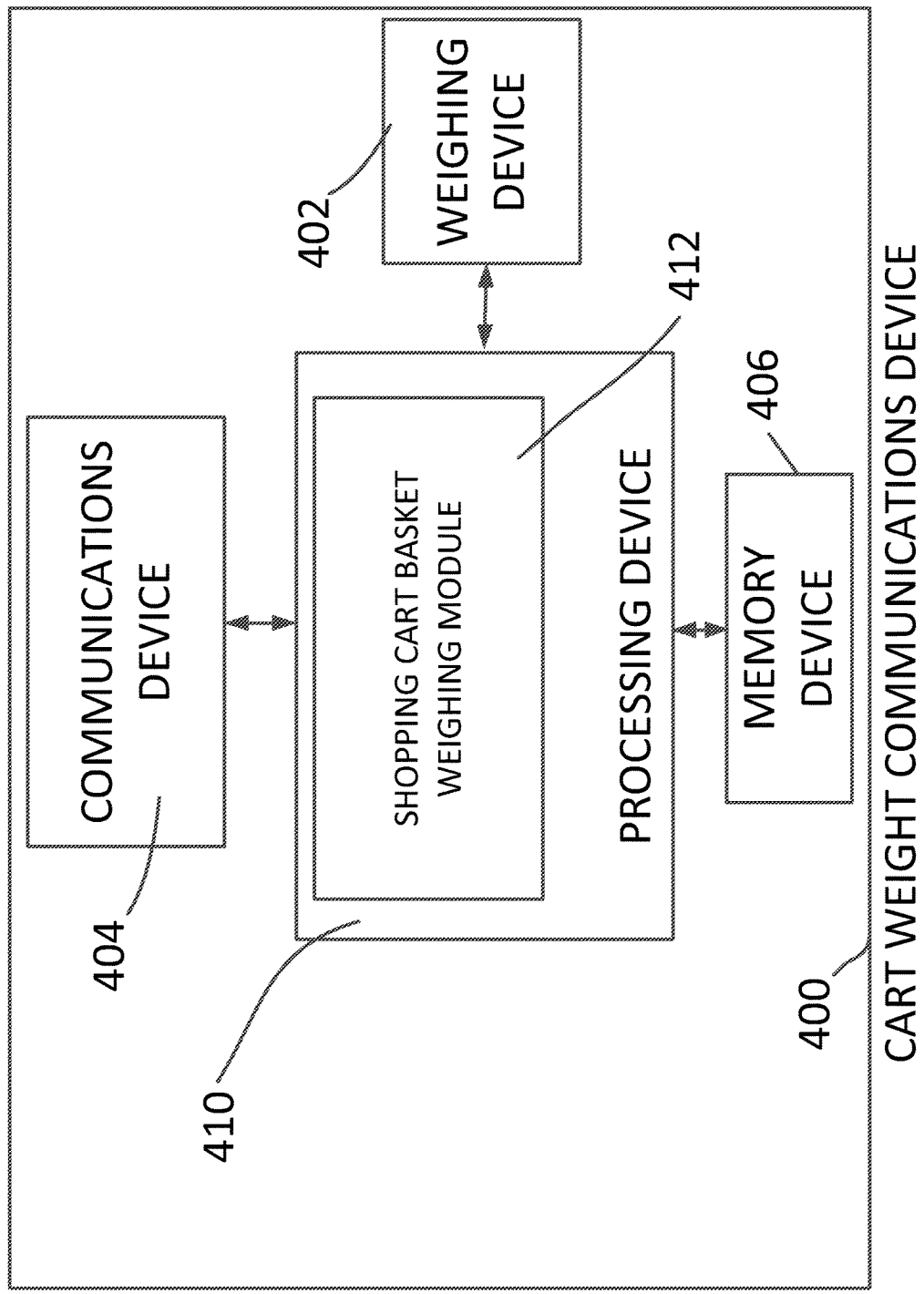
FIG. 7 is a functional block diagram illustrating a cart weight communications device, according to some embodiments of the present disclosure.

FIG. 7 schematically illustrates a cart weight communications device that can be used to monitor and report a weight or incremental weight changes to a shopping cart basket. Cart weight communications device 400 is a device mounted to a shopping cart monitoring a weighing device 402 and communicating weight measurements to a remote server, for example, server 30. Depending upon the multiple functions for which a basket weight measurement can be utilized, device 400 can be in communication with a plurality of servers. Device 400 can include a processing device 410, a weighing device 402, a communications device 404, and a memory device 406.

The processing device 410 can include memory, e.g., read only memory (ROM) and random access memory (RAM), storing processor-executable instructions and one or more processors that execute the processor-executable instructions. In embodiments where the processing device 410 includes two or more processors, the processors can operate in a parallel or distributed manner. The processing device 410 can execute the operating system of the cart weight communications device 400. In the illustrative embodiment, the processing device 410 also executes a shopping cart basket weighing module 412, which is described in greater detail below.

Weighing device 402 is a device that allows a user to interact with the cart weight communications device 400. Weighing device 402 can include any electronic scale or device capable of measuring a weight known in the art. One exemplary device used for weighing objects is a resistive load cell embodied as a wheatstone bridge circuit. By measuring a resistance value of the circuit, a weight applied to the object being monitored, such as a shopping cart basket, can be electronically measured.

The communication device 104 is a device that allows the cart weight communications device 400 to communicate with another device, e.g., the a server over a wireless network. The communication device 104 can include one or more wireless transceivers for performing wireless communication and/or one or more communication ports for performing wired communication.

Shopping cart basket weighing module 412 includes programming to monitor an output from weighing device 402, for example, a monitored resistance value, and output a measured value such as a basket weight. Module 412 can output a raw value for the weight of the basket. In another embodiment, module 412 can filter or otherwise manipulate the basket weight in order to output a desired value. For example, a customer can inadvertently touch the shopping cart basket or put a foreign object such as a purse in the basket. Programming can disqualify readings based upon transients or readings indicating that the customer has placed somehow invalidated the weight measurement. In one embodiment, the shopping cart can include a small LED display screen including instructions from device 400, such as "PLEASE REMOVE FOREIGN OBJECT FROM CART." In another embodiment, device 400 can include a speaker either giving an audio instruction, e.g., to clear items from the basket, or a buzzer sound corresponding to a placard, for example, in the handle of the cart alerting the customer that a buzzer indicates a problem with the basket weight measurement.

Figure 8:
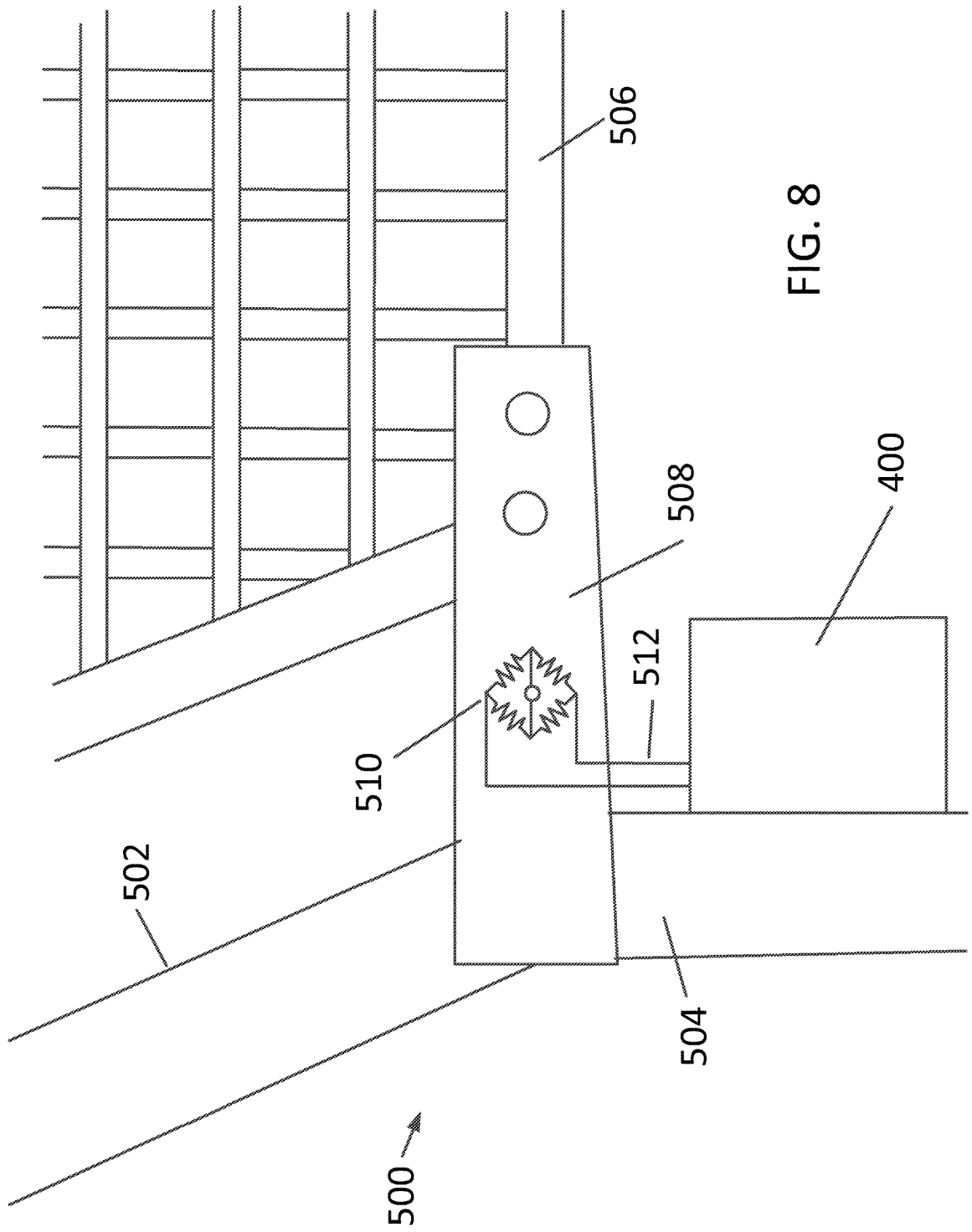
FIG. 8 is a schematic illustrating a cart weight communications device, according to some embodiments of the present disclosure.

FIG. 8 schematically illustrates a shopping cart with a resistive load cell configured to measure a weight of the basket and a cart weight communications device. Configuration 500 includes shopping cart 502 equipped with a cart weight communications device 400. Cart 502 includes a shopping cart basket 506 attached to a cart frame 504 through a basket bracket 508. Cart 502 can include one bracket 508 on each side of the cart. Bracket 508 is equipped with a resistive load cell embodied as a wheatstone bridge circuit 510. Circuit 510 is configured according to circuit design characteristics known in the art and is attached to bracket 508 in order to measure strain or deformation of bracket 508 based upon weight added to basket 506. Each bracket 508 can have a circuit 510. Cart weight communications device 400 monitors circuit 510 or each circuit 510 through connection 512 to determine or estimate a weight applied to basket 506.

Figure 9:
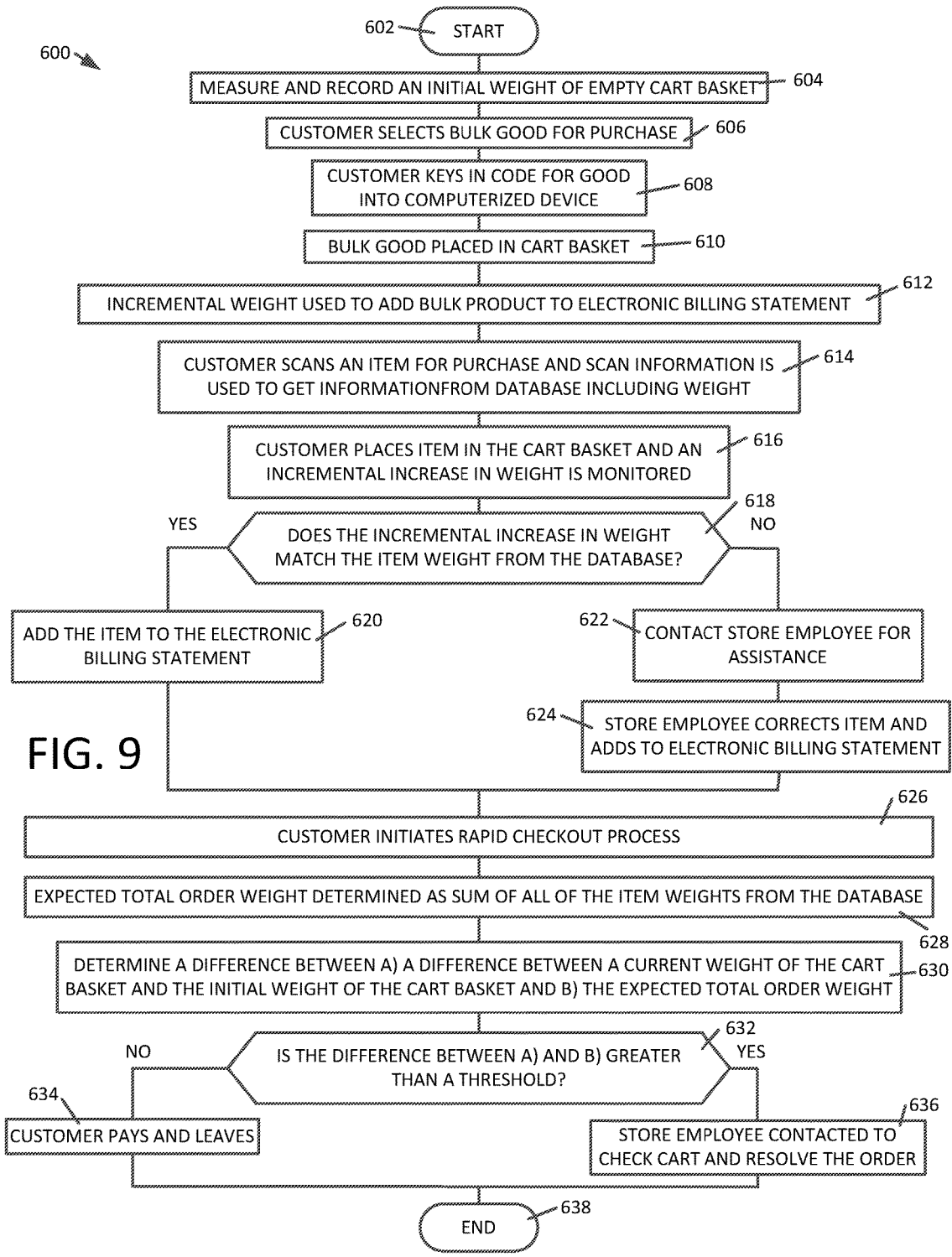
FIG. 9 is a flow chart illustrating an exemplary process using a cart weight communications device, according to some embodiments of the present disclosure.

FIG. 9 is a flowchart illustrating an exemplary process to use incremental changes to cart basket weight in a customer scan and rapid checkout process. Process 600 starts at step 602. At step 604, an initial weight of the cart basket without any scanned items in the basket can be taken. According to one embodiment, the customer can be instructed to add to the basket any object that the customer does not want to carry when shopping, and the initial weight can include any object, such as a purse or a set of gloves, that the customer does not want to carry while shopping. At step 606, the customer can select a bulk good, a good charged by unit weight, for purchase. At step 608, the customer keys in a lookup code for the bulk good. At step 610, the bulk good can be placed in the shopping cart basket. A display screen such as an LED screen connected to the shopping cart or an audio message can help the customer to take the correct steps. In another embodiment, the portable computerized device can provide the shopper with instructions, e.g., "The code you provided is for snow peas. Please add them to the cart now." At step 612, an incremental weight added to the basket when the bulk good was added to the basket is recorded, and the bulk good can be added to the electronic billing statement of the customer based upon the per weight unit charge and the measured incremental weight. At step 614, the customer can scan an item for purchase, and information from the scan can be used to look up the item in a remote database. A weight of the item can be provided from the database. At step 616, the customer adds the scanned item to the basket and an incremental increase in weight in the basket is measured. At step 618, the incremental increase in weight is compared to the weight value from the database for the item. If the measured weight matches the value from the database, then the process advances to step 620, where the item is added to the electronic billing statement. If the measured weight does not match the value from the database, e.g., differs from the value by more than a threshold, then the process advances to step 622 whereat a store employee is contacted to assist the shopper. At step 624, the store employee reviews the product and the incremental weight added to the basket, resolves the issue, and adds the item to the electronic billing statement. In one embodiment, the store employee can utilize a portable computerized device or a fixed terminal in the store to resolve the issue. At step 626, the customer initiates a rapid checkout process. At step 628, an expected total order weight is computed based upon database values for each of the items on the electronic billing statement. At step 630, the expected total order weight is compared to a measured net order weight or a difference between a current weight of the cart and the initial weight of the cart. At step 632, a determination is made whether a difference between the expected total order weight and the measured net order weight exceeds a threshold. If the difference is greater than the threshold then a store employee is contacted at step 636 to check the cart and resolve the order. If the difference is not greater than the threshold, then the customer can pay and leave the store. The process ends at step 638. Process 600 is provided as an example of how a cart basket weight can be used. In another embodiment, unexpected increases in cart weight can be flagged or alerted, and the customer can be asked to check whether he or she put an item in the cart without scanning it. In another embodiment, a large increase in cart weight can be used to flag a store employee to ask the customer if he or she would like help loading a heavy object into the customer's vehicle. In another embodiment, rapid and large swings in cart basket weight could lead to a conclusion that the customer is permitting a child to play in the basket, causing an unsafe condition, and a store employee could be alerted to ask that the customer resolve the unsafe use or condition. Various embodiments can include a basket weight output value based upon a weight from the shopping cart basket, and assisting or enabling smooth operation of the customer scan and rapid checkout process, e.g., providing a message to the customer and/or to store personnel or updating the electronic billing statement, based upon the basket weight output value. A number of exemplary uses for a cart basket weight measurement are envisioned, and the disclosure is not intended to be limited to the particular examples provided herein.

A software application is disclosed, including checking a shopping cart basket for un-scanned items, the application being installed on a portable computerized device of a store employee. The device can receive a report from a remote server including a comparison of an expected total order weight of items in a shopping cart basket and a measured net weight of items in the shopping cart basket. If the expected total order weight of items matches the measured net weight of the items, then the employee can permit the shopping cart to leave the store without inspection. If the expected total order weight of items fails to match the measured net weight of the items, the employee can inspect the shopping cart to resolve the error.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:
1. A computerized server comprising:
 a product information module including programming to access a product information database;
 a scan fault identification module including programming to:
  receive the plurality of scanned barcodes generated by a customer operated purchasing device in a retail store, compare the plurality of scanned barcodes to a plurality of known barcodes in the product information database, determine that a first barcode of the plurality of scanned barcodes corresponding to a first product fails to identify a known product in the product information database, and identify a product identification scan fault for the first barcode, and
  monitor data from the product information module utilizing a shopping cart equipped with a weight measuring device to monitor an incremental weight associated with a second product added to the cart, compare the incremental weight to a reference weight associated with a second barcode from the second product, and identify a product weight scan fault based upon the comparing, and
 a store personnel coordination module generating an alert to a store employee based upon the product identification scan fault and the product weight scan fault;

a checkout module including programming to place a list of products associated with the plurality of scanned barcodes into a virtual shopping cart, the list including a running price total;

a graphical user interface generated on the customer operated purchasing device, the graphical user interface programmed to:

display the virtual shopping cart and the running price total to the customer on the customer operated purchasing device;

mark the first product associated with the product identification scan fault as on hold pending resolution of the product identification scan fault; and display instructions from the store personnel coordination module to resolve the product identification scan fault, wherein the instructions include at least a request that the customer capture a photograph of the entire first product with the customer operated purchasing device, and transmit the photograph to the server.

2. The computerized server of claim 1, further comprising programming to receive uploaded information from the store employee regarding the scan fault.

3. The computerized server of claim 1, further comprising programming to:

alert store management if the store employee fails to resolve the scan fault within a threshold scan fault time; and provide the store management an option to set a price related to the scan fault.

4. The computerized server of claim 1, wherein alerting the store employee comprises alerting the closest employee.

5. The computerized server of claim 1, wherein alerting the store employee comprises generating a push notification to the employee.

6. The computerized server of claim 1, wherein alerting the store employee comprises displaying a store map including a location of the customer.

7. A computer-implemented method comprising:

accessing, by a product information module of a computerized server, a product information database;

receiving, by a scan fault identification module, a plurality of scanned barcodes generated by a customer operated purchasing device in a retail store;

comparing, by the scan fault identification module, the plurality of scanned barcodes to a plurality of known barcodes in the product information database;

determining, by the scan fault identification module, that a first barcode of the plurality of scanned barcodes corresponding to a first product fails to identify a known product in the product information database;

identifying, by the scan fault identification module, a product identification scan fault for the first barcode;

providing a weight measuring device in a shopping cart;

generating, by the weight measuring device, a signal containing information including an incremental weight associated with a second product added to the cart;

receiving, by the scan fault identification module of the computerized server, the signal from the weight measuring device;

comparing, by the scan fault identification module, the incremental weight to a reference weight associated with a scanned barcode from the second product;

identifying, by the scan fault identification module, a product weight scan fault based upon the comparing;

generate, by a store personnel coordination module of the computerized server, an alert to a store employee based upon the product identification scan fault and the product weight scan fault;

storing, by a checkout module of the computerized server, a list of products associated with the plurality of scanned barcodes, the list including a running price total;

placing, by the checkout module, the list of products into a virtual shopping cart; and generating, by the checkout module, a graphical user interface on the customer operated purchasing device, the graphical user interface programmed to:

display the virtual shopping cart and the running price total to the customer on the customer operated purchasing device, mark the first product associated with the product identification scan fault as on hold pending resolution of the scan fault, and display instructions from the store personnel coordination module to resolve the product identification scan fault, wherein the instructions include at least a request that the customer capture a photograph of the entire first product with the customer operated purchasing device, and transmit the photograph to the server.

8. An apparatus comprising:

a weight measuring device in a shopping cart;

a mobile device associated with a customer using the shopping cart in a retail store; and a computerized server communicatively coupled to the weight measuring device and the mobile device, the computerized server including a processing device, the processing device further configured to perform operations comprising:

accessing, by a product information module, a product information database, receiving, by a scan fault identification module, a plurality of scanned barcodes generated by the mobile device, comparing, by the scan fault identification module, the plurality of scanned barcodes to a plurality of known barcodes in the product information database, determining, by the scan fault identification module, that a first barcode of the plurality of scanned barcodes corresponding to a first product fails to identify a known product in the product information database, identifying, by the scan fault identification module, a product identification scan fault for the first barcode;

generating, by the weight measuring device, a signal containing information including an incremental weight associated with a second product added to the cart, receiving, by a scan fault identification module, the signal from the weight measuring device, comparing, by the scan fault identification module, the incremental weight to a reference weight associated with a scanned barcode from the second product, identifying, by the scan fault identification module, a product weight scan fault based upon the comparing, generate, by a store personnel coordination module, an alert to a store employee based upon the product identification scan fault and the product weight scan fault, storing, by a checkout module, a list of products associated with the plurality of scanned barcodes, the list including a running price total, placing, by the checkout module, the list of products into a virtual shopping cart, and generating, by the checkout module, a graphical user interface on the mobile device, the graphical user interface programmed to:

display the virtual shopping cart and the running price total to the customer on the mobile device, mark the first product associated with the product identification scan fault as on hold pending resolution of the scan fault, and display instructions from the store personnel coordination module to resolve the product identification scan fault, wherein the instructions include at least a request that the customer capture a photograph of the entire first product with the mobile device, and transmit the photograph to the server.

* * * * *